(12) United States Patent
Floyd, III et al.

(10) Patent No.: US 10,348,553 B2
(45) Date of Patent: Jul. 9, 2019

(54) ISOLATION AND MONITORING MODE FOR PROBLEMATIC DATA LINKS

(71) Applicant: International Business Machines Corporation, Armonk, NY (US)

(72) Inventors: Robert K Floyd, III, Clermont, FL (US); Catalin Marica, Bucharest (RO); Marian Tudosoiu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 15/200,842

(22) Filed: Jul. 1, 2016

(65) Prior Publication Data

US 2018/0006875 A1    Jan. 4, 2018

(51) Int. Cl.
*H04L 12/24*    (2006.01)
*H04L 12/26*    (2006.01)

(52) U.S. Cl.
CPC ...... *H04L 41/0659* (2013.01); *H04L 43/0811* (2013.01); *H04L 43/0823* (2013.01); *H04L 43/16* (2013.01)

(58) Field of Classification Search
CPC ............. H04L 41/0627; H04L 41/0659; H04L 41/0663; H04L 41/0686; H04L 43/0811; H04L 43/0823; H04L 43/16; H04L 45/22
See application file for complete search history.

(56) References Cited

U.S. PATENT DOCUMENTS

| | | |
|---|---|---|
| 7,502,238 B2 | 3/2009 | Wei et al. |
| 8,543,728 B2 | 9/2013 | Pan et al. |
| 2009/0046579 A1 | 2/2009 | Lu et al. |
| 2011/0238843 A1* | 9/2011 | Pan .......................... H04L 45/22 709/227 |
| 2012/0127850 A1* | 5/2012 | Bauchot ............. H04L 41/0627 370/216 |
| 2013/0176842 A1 | 7/2013 | Bauchot et al. |

OTHER PUBLICATIONS

IP Routing: BFD Configuration Guide, Cisco IOS XE Release 3S, pp. 1-6 http://www.cisco.com/c/en/us/td/docs/ios-xml/ios-xml/ios/iproute_bfd/configuration/xe-3s/irb-xe-3s-book/irb-bfd-damp.html.
Spanning Tree Protocol Problems and Related Design Considerations, p. 1-10 http://www.cisco.com/c/en/us/support/docs/lan-switching/spanning-tree-protocol/10556-16.html.

* cited by examiner

*Primary Examiner* — Khoa Huynh
(74) *Attorney, Agent, or Firm* — Patterson + Sheridan, LLP (57) ABSTRACT

Techniques for dampening an interface flapping rate between switches in a network environment. An interface of a first switch is designated as being in an active mode in which forwarding activity of the interface is permitted. The interface is determined to exhibit flapping behavior satisfying one or more dampening criteria when in the active mode. An indication is sent to a second switch to isolate the interface. A reply to the indication is received from the second switch. The interface is designated as being in an isolated mode in which health monitoring of the interface is permitted but forwarding activity of the interface is prohibited. The interface is determined to satisfy one or more reinstatement criteria when in the isolated mode. The interface is redesignated as being in the active mode.

20 Claims, 8 Drawing Sheets

ISOLATION AND MONITORING MODE FOR PROBLEMATIC DATA LINKS

BACKGROUND

Embodiments disclosed herein relate to computer network environments. More specifically, embodiments disclosed herein relate to dampening flapping rates of network interfaces to improve stability of computer network environments.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

SUMMARY

One embodiment includes a computer-implemented method to provide network stability by dampening an interface flapping rate between switches in a network environment. The computer-implemented method includes designating an interface of a first switch as being in an active mode in which forwarding activity of the interface is permitted, where the first switch is operatively connected to a second switch via the interface. The computer-implemented method also includes determining that the interface exhibits flapping behavior satisfying one or more dampening criteria when in the active mode. The computer-implemented method also includes sending, to the second switch, an indication that the interface is to be isolated. The computer-implemented also includes receiving, from the second switch, a reply to the indication that the interface is to be isolated. The computer-implemented method also includes designating the interface as being in an isolated mode in which health monitoring of the interface is permitted but forwarding activity of the interface is prohibited. The computer-implemented method also includes determining that the interface satisfies one or more reinstatement criteria when in the isolated mode. The computer-implemented method also includes redesignating the interface as being in the active mode.

Another embodiment includes a computer program product to provide network stability by dampening an interface flapping rate between switches in a network environment. The computer program product includes a non-transitory computer-readable medium having computer-readable program code embodied therewith. The computer-readable program code is executable by one or more computer processors to perform an operation that includes designating an interface of a first switch as being in an active mode in which forwarding activity of the interface is permitted, where the first switch is operatively connected to a second switch via the interface. The operation also includes determining that the interface exhibits flapping behavior satisfying one or more dampening criteria when in the active mode. The operation also includes sending, to the second switch, an indication that the interface is to be isolated. The operation also includes receiving, from the second switch, a reply to the indication that the interface is to be isolated. The operation also includes designating the interface as being in an isolated mode in which health monitoring of the interface is permitted but forwarding activity of the interface is prohibited. The operation also includes determining that the interface satisfies one or more reinstatement criteria when in the isolated mode. The operation also includes redesignating the interface as being in the active mode.

Yet another embodiment includes an apparatus to provide network stability by dampening an interface flapping rate between switches in a network environment. The apparatus includes one or more computer processors; an interface operatively connecting the apparatus to a target switch; and logic operatively connected with the interface and operable by the one or more computer processors to perform an operation. The operation includes designating the interface as being in an active mode in which forwarding activity of the interface is permitted. The operation also includes determining that the interface exhibits flapping behavior satisfying one or more dampening criteria when in the active mode. The operation also includes sending, to the target switch, an indication that the interface is to be isolated. The operation also includes receiving, from the target switch, a reply to the indication that the interface is to be isolated. The operation also includes designating the interface as being in an isolated mode in which health monitoring of the interface is permitted but forwarding activity of the interface is prohibited. The operation also includes determining that the interface satisfies one or more reinstatement criteria when in the isolated mode. The operation also includes redesignating the interface as being in the active mode.

DETAILED DESCRIPTION

Figure 1:
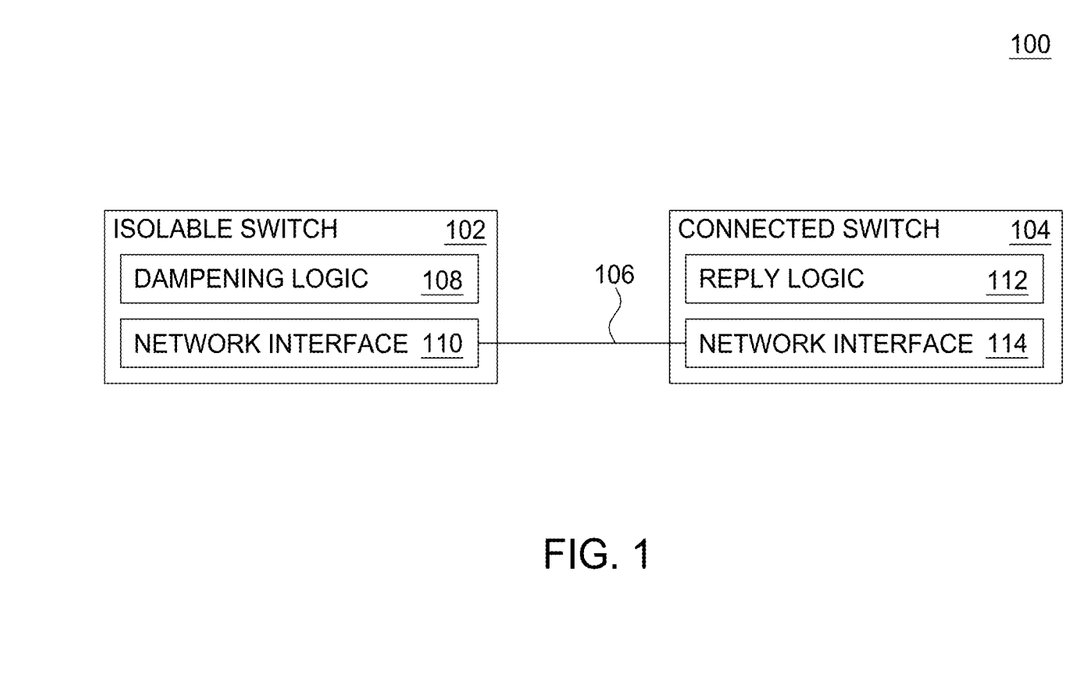
FIG. 1 is a block diagram representing a system configured to dampen flapping rates of network interfaces to improve stability of a network environment, according to one embodiment presented in this disclosure.

Embodiments presented in this disclosure provide techniques for dampening flapping rates of network interfaces to improve stability of a network environment. Referring to FIG. 1, a block diagram representing a system 100 for dampening flapping rates according to one embodiment is shown. The system 100 includes an isolable switch 102 and a connected switch 104, where the isolable switch 102 includes dampening logic 108 and a network interface 110. The connected switch 104 includes reply logic 112 and a network interface 114 operatively connected to the network interface 110 of the isolable switch 102 via a network link 106. The isolable switch 102 and/or the connected switch 104 may also be operatively connected to additional network nodes in the network environment.

Network instability may occur when the network interface 110 exhibits flapping behavior. In one embodiment, the flapping behavior is characterized by a failure of the isolable switch 102, that causes the network interface 110 to continually fluctuate between online and offline states. The flapping behavior may trigger unintended data link layer (Layer-2) events, such as spanning-tree operations involving clearing media access control (MAC) tables of network switches in the network environment and flooding the network environment until the MAC tables can be rebuilt. The flapping behavior may also trigger unintended network layer (Layer-3) events, such as routing protocol convergence, involving purging and installing routes. These triggered events can increase processor utilization levels and impact downstream devices, thus resulting in network instability.

Accordingly, in one embodiment, the isolable switch 102 designates, or assigns, the network interface 110 as being in an isolated mode, when one or more configurable thresholds are met. The configurable thresholds may include a count of topology change notifications issued by spanning-tree processes as a result of the flapping behavior. The configurable thresholds may also include a count of routes removed or added as a result of the flapping behavior. When in the isolated mode, collection of statistics is permitted for the network interface 110, but the network interface 110 is precluded from participating in forwarding processes, such that from the perspective of routing protocols and topology generation protocols, the network interface 110 is effectively regarded as being offline (despite actually exhibiting flapping behavior). In some embodiments, the network interface 110 may be reinstated upon one or more reinstatement criteria being satisfied, such as an isolation interval elapsing and/or the network interface 110 stabilizing. Reinstating the network interface 110 may also be referred to herein as reintroducing the network interface 110 to the network environment.

By using the techniques disclosed herein, network environments may be configured to permit collecting statistics on a link and use the collected statistics to keep a link in the isolated mode as long as the configurable thresholds are exceeded. A given link can be dynamically isolated and subsequently reinstated once the link stabilizes. Because links in the isolated mode do not participate in network routing protocols or topology generation protocols, flapping-related traffic in the network, such as topology change notifications, is reduced, thereby improving stability of the network environment.

At least in some embodiments, the isolable switch 102 designates its network interface 110 as being in the isolated mode only upon sending an indication to the connected switch 104 on the other end of the link and receiving an acknowledgment from the connected switch 104. Doing so permits the connected switch 104 to designate its network interface 114 as being in the isolated mode, in order to preclude a black hole from being formed and silently dropping traffic in the network environment. If no acknowledgment is received from the connected switch 104, the isolable switch 102 designates its network interface 110 as being administratively down, also referred to herein as being inactive or disabled.

Figure 2:
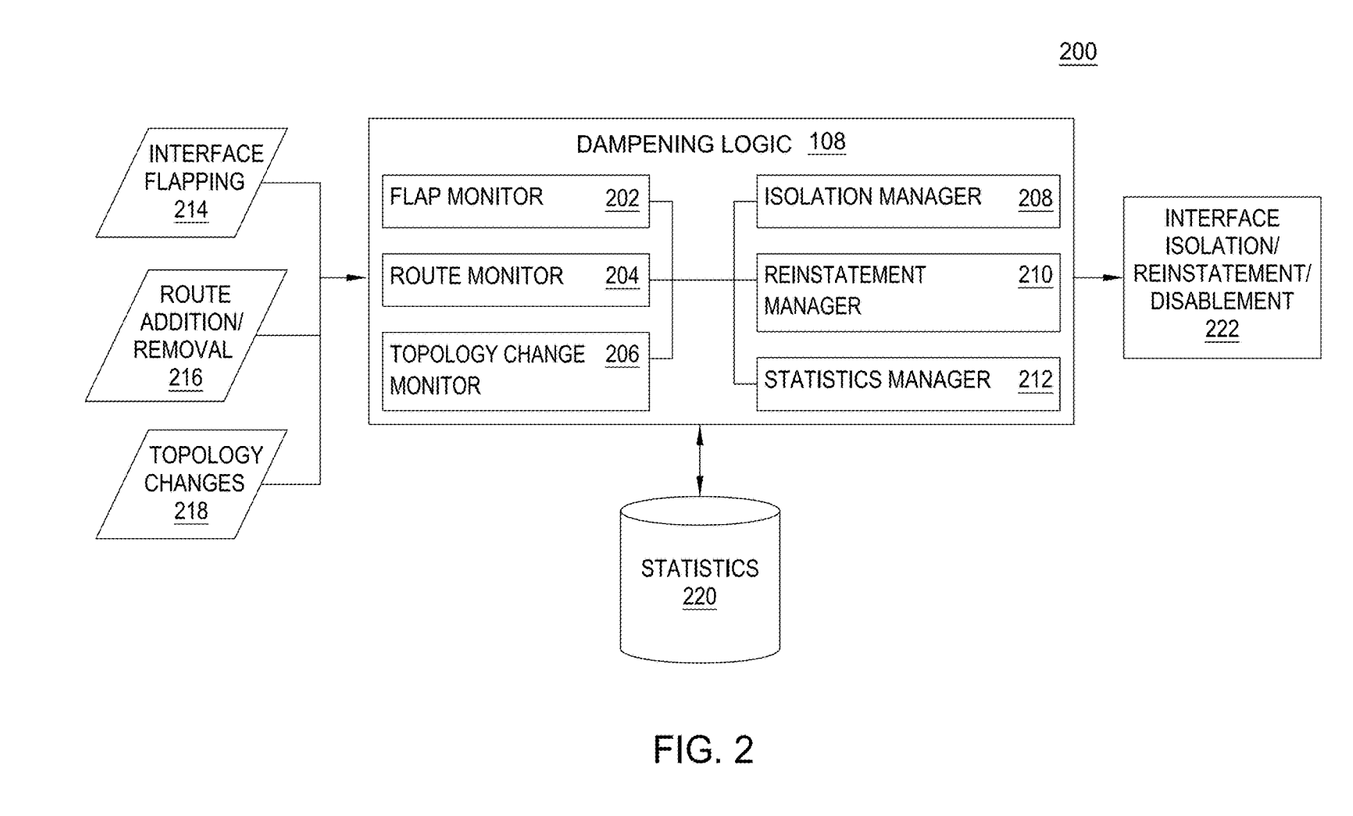
FIG. 2 is a block diagram illustrating components of the system configured to dampen flapping rates of network interfaces to improve stability of the network environment, according to one embodiment presented in this disclosure.

FIG. 2 is a block diagram illustrating components 200 of the dampening logic 108 of FIG. 1, according to one embodiment presented in this disclosure. As shown, the components 200 include a flap monitor 202, a rate monitor 204, a topology change monitor 206, an isolation manager 208, a reinstatement manager 210, and a statistics manager 212. As described in further detail herein, the dampening logic 108 performs isolation, reinstatement, and/or disablement 222 of the network interface 110 based on interface flapping 214, route addition or removal 216, and/or topology changes 218, including collecting statistics 220 of the network interface 110 when the network interface 110 is in an isolated mode. The interface flapping 214 is detected by the flap monitor 202; the route addition/removal 216 is detected by the route monitor 204; and the topology changes 218 are detected by the topology change monitor 206. The network interface 110 is monitored by the statistics manager 212 to generate the statistics 220. The interface isolation, reinstatement, and disablement 222 are collectively performed by the isolation manager 208 and the reinstatement manager 210.

Figure 3:
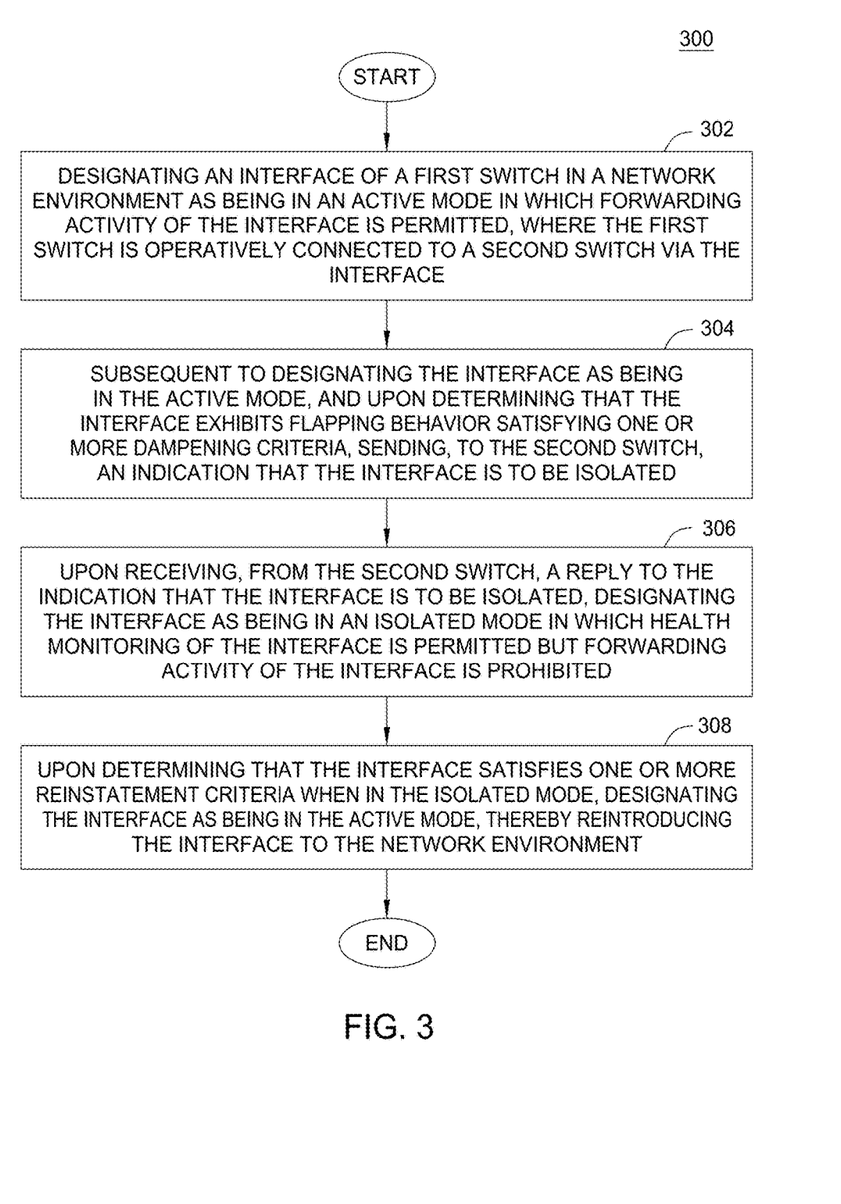
FIG. 3 is a flowchart depicting a method to dampen flapping rates of network interfaces to improve stability of the network environment, according to one embodiment presented in this disclosure.

FIG. 3 is a flowchart depicting a method 300 to dampen flapping rates of network interfaces to improve stability of the network environment, according to one embodiment presented in this disclosure. As shown, the method 300 begins at step 302, where the dampening logic 108 designates the network interface 110 as being in an active mode, in which forwarding activity of the interface is permitted. At step 304, subsequent to designating the network interface 110 as being in the active mode, and upon determining that the network interface 110 exhibits flapping behavior satisfying one or more dampening criteria, the dampening logic 108 sends, to the connected switch 104, an indication that the network interface 110 is to be isolated. At least in some embodiments, the one or more dampening criteria are evaluated over an evaluation time interval. In one embodiment, the network interface 110 is designated as being in the isolated mode in order to preclude any flapping of the network interface 110 from impacting stability of the network environment.

In one embodiment, the one or more dampening criteria are satisfied upon detecting at least a threshold count of topology change notifications being issued in a predefined notification time interval due to the flapping behavior of the network interface 110. In a particular embodiment, the topology change notifications are issued according to a network protocol for topology generation, an example of which is spanning tree protocol. The one or more dampening criteria are also satisfied upon detecting at least a threshold count of routes being withdrawn (or added) due to the flapping behavior of the interface. The one or more dampening criteria are also satisfied upon detecting at least a threshold count of flapping occurrences of the interface in an occurrence time interval.

At step 306, upon receiving, from the connected switch 104, a reply to the indication that the network interface 110 is to be isolated, the dampening logic 108 designates the interface as being in an isolated mode, in which health monitoring of the network interface 110 is permitted but forwarding activity of the network interface 110 is prohibited. At least in some embodiments, during the isolated mode, and from the perspective of any routing protocol and/or topology generation protocol, the network interface 110 is regarded as being effectively offline (despite the interface actually exhibiting flapping behavior). In a particular embodiment, the network interface 110 is designated as being in the isolated mode only upon receiving the reply from the connected switch 104, such as to permit the connected switch 104 to designate the network interface 114 as being in the isolated mode, and in order to preclude a black hole from being formed and silently dropping traffic in the network environment. The isolated mode may be specific to a particular link or port of a particular network interface, such that different links or ports of a given switch may be independently isolated.

In one embodiment, when the network interface 110 is in isolated mode, flapping of the network interface 110 does not trigger any clearing of media access control (MAC) tables in one or more switches in the network environment and further does not trigger any associated flooding of the network environment for rebuilding the MAC tables. Additionally or alternatively, when the network interface 110 is in isolated mode, flapping of the network interface 110 does not trigger any withdrawal or addition of routes in the one or more switches in the network environment.

In one embodiment, during the isolated mode, the statistics 220 on the network interface 110 are collected, including results from monitoring errors and transitions of the network interface 110, along with associated timestamps. At step 308, upon determining that the network interface 110 satisfies one or more reinstatement criteria when in the isolated mode, the dampening logic 108 redesignates the network interface 110 as being in the active mode, thereby reintroducing the network interface 110 to the network environment. In a particular embodiment, the one or more reinstatement criteria are satisfied upon detecting less than the threshold count of flapping occurrences of the network interface 110 over a predefined isolation time interval subsequent to designating the network interface 110 as being in the isolated mode.

In one embodiment, upon failing to receive, from the connected switch 104 and within a reply time interval, any reply to the indication that the network interface 110 is to be isolated, the dampening logic 108 designates the network interface 110 as being in an inactive mode, in which forwarding activity and health monitoring of the network interface 110 are prohibited. At least in some embodiments, the network interface 110 when in the active mode is ineligible for reinstatement into the network environment even when satisfying the one or more reinstatement criteria.

In one embodiment, upon detecting at least the threshold count of flapping occurrences of the interface over the isolation time interval subsequent to designating the network interface 110 as being in the isolated mode, the dampening logic 108 sends, to the connected switch 104, an indication to restart the isolation time interval. Upon receiving, from the connected switch 104, a reply to the indication to restart the predefined isolation time interval, the dampening logic 108 restarts the predefined isolation time interval in order to determine presence of at least the threshold count of flapping occurrence of the network interface 110 over the restarted isolation time interval.

In one embodiment, upon failing to receive, within the reply time interval, any reply to the indication to restart the predefined isolation time interval, the dampening logic 108 designates the network interface 110 as being in the inactive mode. At least in some embodiments, the evaluation time interval, the occurrence time interval, the isolation time interval, and the reply time interval are each configurable based on user input and can each be distinct in measure.

Additionally or alternatively, the threshold count of topology change notifications, the threshold count of routes being withdrawn, the threshold count of routes being added, and the threshold count of flapping occurrences are each configurable based on user input and can each be distinct in measure.

Figure 4:
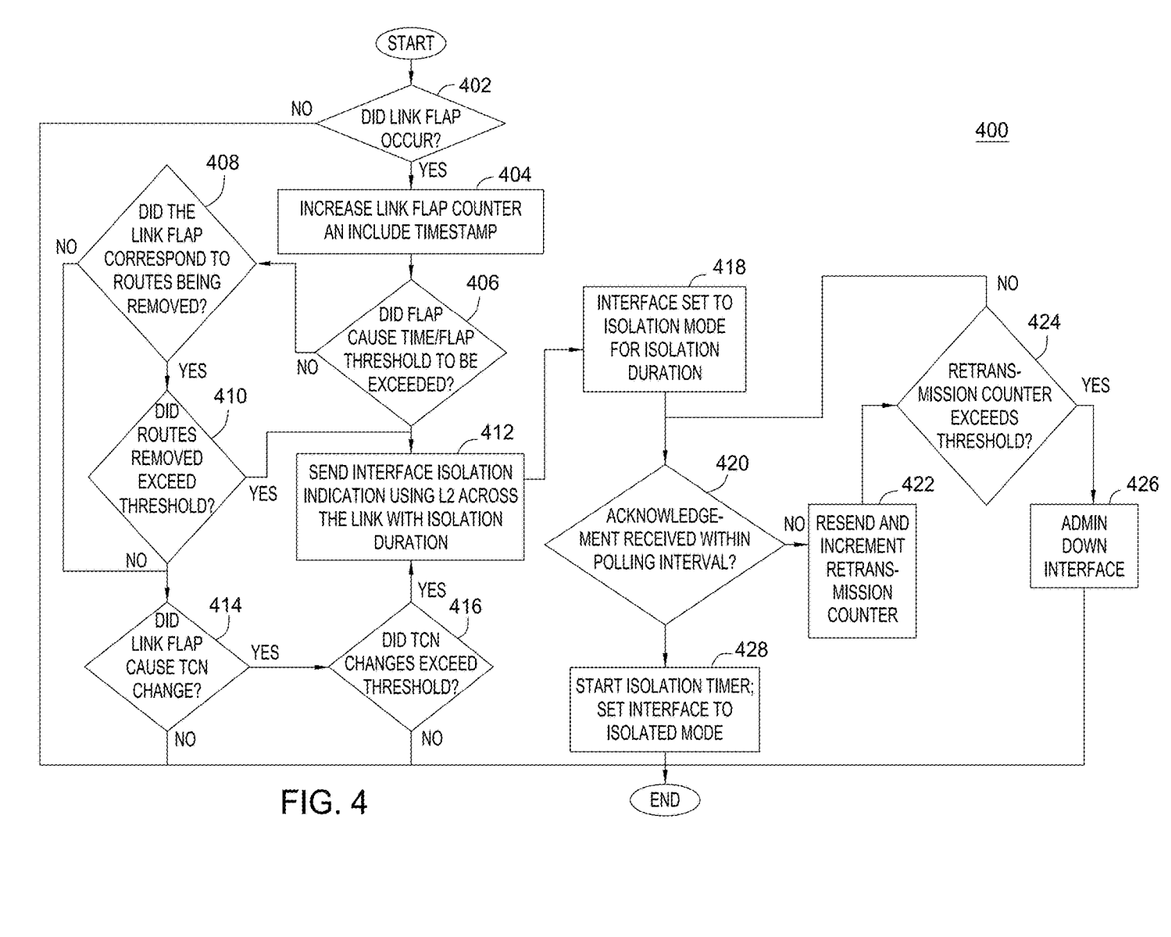
FIG. 4 is a flowchart depicting a method for an isolable switch to initiate an isolated mode, according to one embodiment presented in this disclosure.

FIG. 4 is a flowchart depicting a method 400 for the isolable switch 102 of FIG. 1 to initiate an isolated mode, according to one embodiment presented in this disclosure. As shown, the method 400 begins at step 402, where the dampening logic 108 determines whether the network interface 110 has flapped. If so, then at step 404, the dampening logic 108 increases a flap counter and records a timestamp; otherwise, the method 400 terminates.

At step 406, the dampening logic 108 determines whether the threshold count of flapping occurrences has been exceeded. If so, then at step 412, the dampening logic 108 sends an indication to the connected switch 104 that the interface 110 is to be designated as being in the isolated mode. The indication also conveys to the connected switch 104 to designate the network interface 114 as being in the isolated mode. At least in some embodiments, the indication includes an isolation duration for the isolable switch 102 and the connected switch 104 to each take into account in keeping the network interfaces 110, 114 in the isolated mode. The indication may be sent as a data-link-layer message across the network link 106.

On the other hand, if the threshold count of flapping occurrences has not been exceeded (step 406), then the dampening logic 108 determines whether the flapping caused routes to be added (or withdrawn) (step 408), and whether the count of added (or withdrawn) routes exceeds the threshold count of routes (step 410). If the flapping caused the threshold count of routes to be exceeded, then the dampening logic 108 sends the interface isolation indication to the connected switch 104 (step 412). Otherwise, the dampening logic 108 determines whether the flapping caused any topology change notifications (step 414), and whether the count of topology change notifications exceeds the threshold count of topology change notifications (step 416). If the flapping caused the threshold count of topology change notifications to be exceeded, the dampening logic 108 sends the interface isolation indication to the connected switch 104 (step 412); otherwise, the method 400 terminates. In this regard, a link going down and then back up can cause a topology change notification to let the spanning tree recalculate a best path to the root during each event. Further, a link going down can cause a routing process to purge routes if the next hop is no longer available due to a directly connected network holding the next hop but being down. Interfaces that were down and then coming online can add in new routes learned across that link from a routing peer on that attached network.

After sending the interface isolation indication (step 412), then at step 418, the dampening logic 108 designates the network interface 110 as being in the isolated mode. Then at step 420, the dampening logic 108 determines whether an acknowledgment has been received from the connected switch 104. If so, then at step 428, the dampening logic 108 starts an isolation timer to facilitate keeping the network interface 110 in the isolated mode only for the isolation duration. Otherwise, at step 422, the dampening logic 108 resends the interface isolation indication to the connected switch 104 and increments a retransmission counter. Steps 420 and 422 may be repeated based on a polling frequency and up to the retransmission counter. Other embodiments, such as an acknowledgment time window derived from the polling frequency or even independent of the polling frequency, are broadly contemplated. At step 424, if the retransmission counter is exceeded, and still no acknowledgment has been received, then at step 426, the dampening logic 108 designates the network interface 110 as being in the inactive mode. After the steps 426 or 428, the method 400 terminates.

Figure 5:
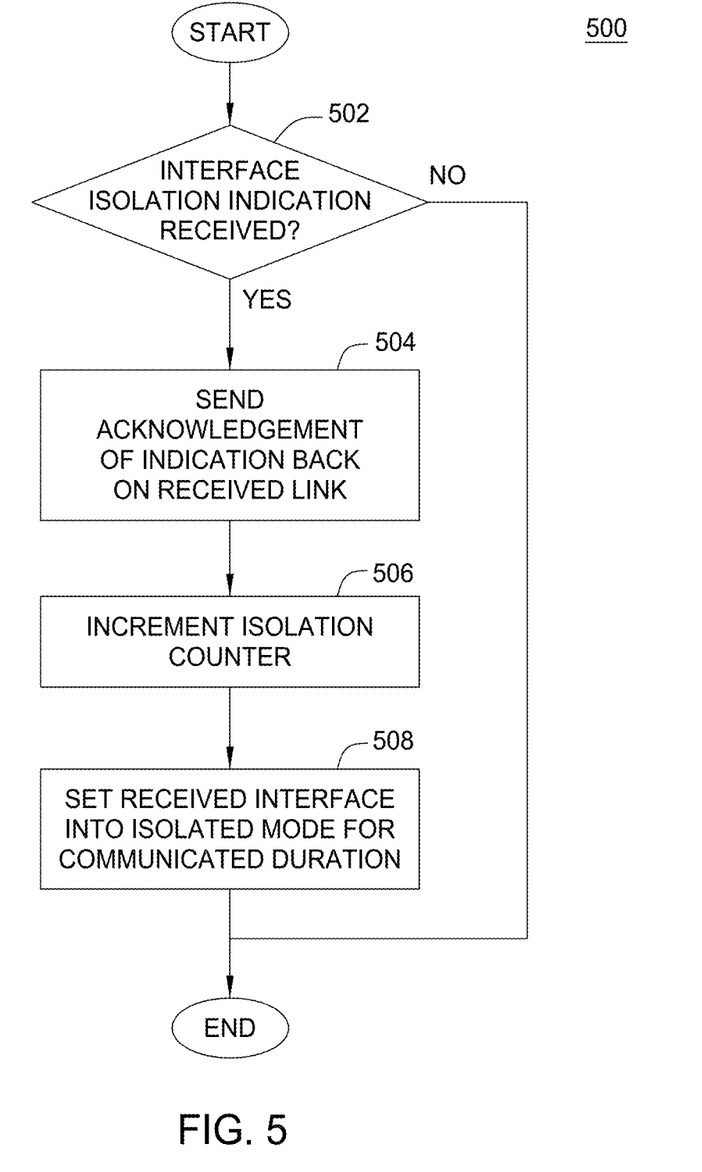
FIG. 5 is a flowchart depicting a method for a connected switch to respond to an initiation of the isolated mode, according to one embodiment presented in this disclosure.

FIG. 5 is a flowchart depicting a method 500 for the connected switch 104 of FIG. 1 to respond to an initiation of the isolated mode, according to one embodiment presented in this disclosure. As shown, the method 500 begins at step 502, where the reply logic 112 determines whether an interface isolation indication has been received. If so, then at step 504, the reply logic 112 sends an acknowledgment of the indication back via the network link 106; otherwise, the method 500 terminates. After sending the acknowledgment (step 504), the reply logic 112 increments an isolation counter (step 506) and designates the network interface 114 as being in the isolated mode for the duration specified in the indication (step 508). After the step 508, the method 500 terminates.

Figure 6:
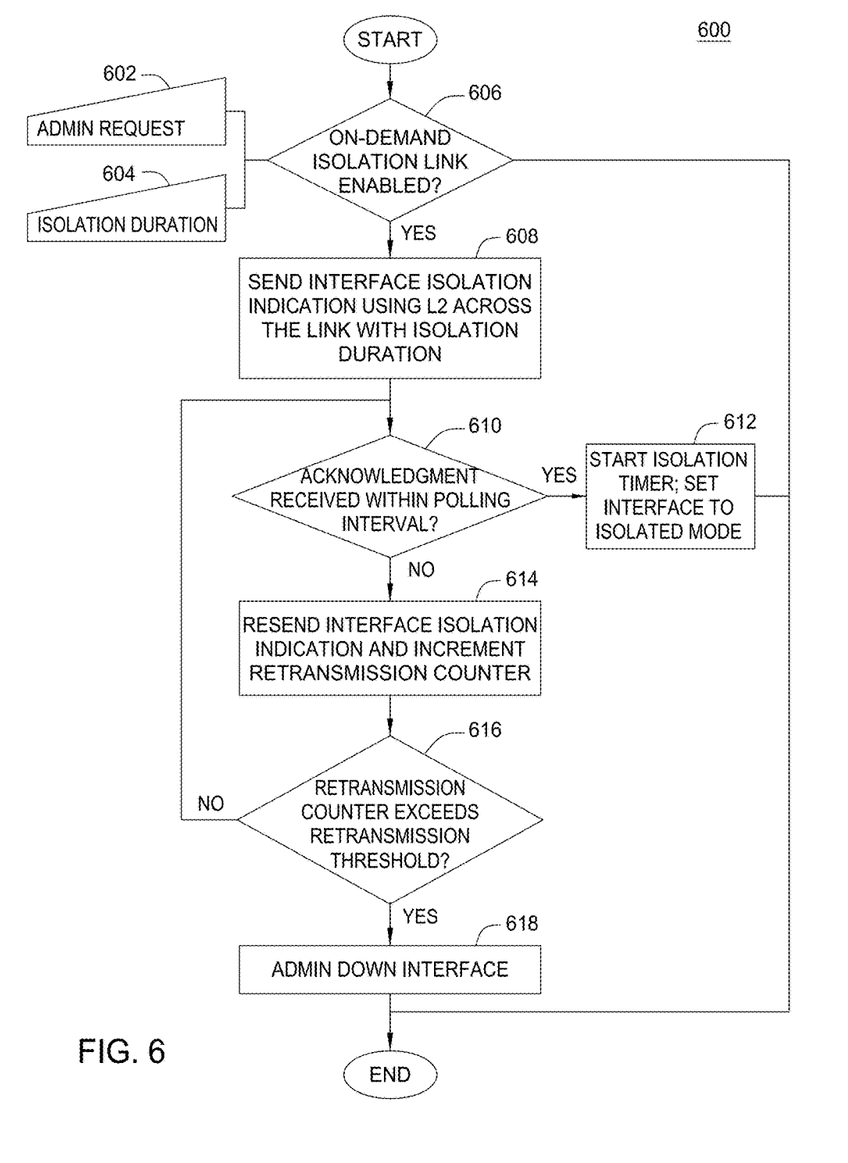
FIG. 6 is a flowchart depicting a method for initiating the isolated mode of the isolable switch on demand, according to one embodiment presented in this disclosure.

FIG. 6 is a flowchart depicting a method 600 for initiating the isolated mode of the isolable switch 102 on demand, according to one embodiment presented in this disclosure. As shown, the method 600 begins at step 606, where the dampening logic 108 determines whether on-demand isolation of the network link 106 has been requested, e.g., via a request 602 by an administrator or other user of the isolable switch. Depending on an embodiment, the administrator or other user may specify an isolation duration 604. If so, then at step 608, the dampening logic 108 sends an indication to the connected switch 104 that the interfaces 110, 114 are to be designated as being in the isolated mode; otherwise, the method 600 terminates. The indication may include the isolation duration and may be sent as a data-link-layer message across the network link 106.

At step 610, the dampening logic 108 determines whether an acknowledgment has been received within the polling interval. If so, then at step 612, the dampening logic 108 starts an isolation timer and designates the network interface 110 as being in the isolated mode. Otherwise, at step 614, the dampening logic 108 resends the interface isolation indication and increments the retransmission counter. If the retransmission counter exceeds the retransmission threshold, and still no acknowledgment has been received (step 616), then at step 618, the dampening logic 108 designates the network interface 110 as being in the inactive mode. After the step 612 or the step 618, the method 600 terminates.

Figure 7:
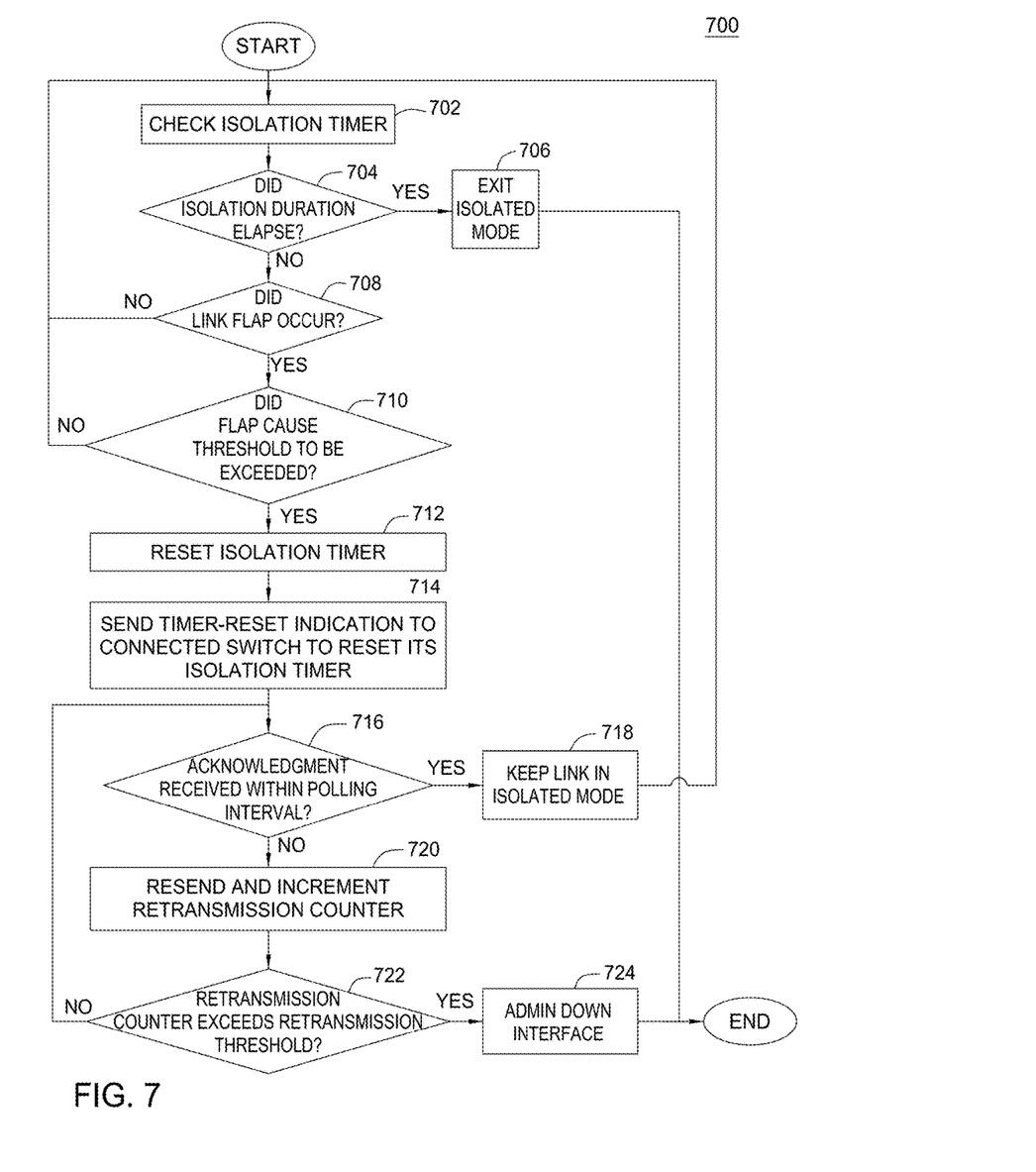
FIG. 7 is a flowchart depicting a method for reinstating a network link subsequent to initiating the isolated mode, according to one embodiment presented in this disclosure.

FIG. 7 is a flowchart depicting a method 700 for reinstating the network link 106 of FIG. 1 subsequent to initiating the isolated mode, according to one embodiment presented in this disclosure. The method 700 represents a predefined mechanism for reintroducing the network link 106 to the network environment; other ways to reinstate the network link 106 are broadly contemplated. In a particular embodiment, however, the network interface 110 when in the active mode is ineligible for the redefined mechanism for reintroduction to the network environment even when satisfying the one or more reinstatement criteria.

As shown, the method 700 begins at step 702, where the dampening logic 108 checks the isolation timer. If the isolation timer indicates that the isolation duration has elapsed (step 704), the dampening logic 108 designates the network interface 110 as being in the active mode, thereby exiting the isolated mode (step 706). At least in some embodiments, the reply logic 112 similarly designates the network interface 114 as being in the active mode upon determining that the isolation duration has elapsed, thereby exiting the isolated mode. After the step 706, the method 700 terminates.

On the other hand, if the isolation timer indicates that the isolation duration has not yet elapsed (step 704), the dampening logic 108 determines whether any link flap occurred (step 708) that caused one or more of the threshold counts to be exceeded (step 710). If so, the dampening logic 108 resets the isolation timer (step 712). The threshold counts include the threshold count of topology change notifications, the threshold count of routes being withdrawn, the threshold count of routes being added, and the threshold count of flapping occurrences.

At step 714, the dampening logic 108 sends a timer-reset indication to the connected switch 104. Upon receiving the timer-reset indication, the reply logic 112 sends an acknowledgment to the isolable switch 102 and resets the isolation timer of the connected switch 104, such that the isolation timers of the switches remain synchronized notwithstanding the reset. At step 716, the dampening logic 108 determines whether any acknowledgment has been received within the polling interval, and if so, the dampening logic 108 keeps the network interface 110 in the isolated mode (step 718). After the step 718, the method 700 returns to step 702 to check the isolation timer.

On the other hand, if no acknowledgment has been received within the polling interval (716), the dampening logic 108 resends the timer-reset indication and increments the retransmission counter (step 720). If the retransmission counter exceeds the retransmission threshold (step 722), the dampening logic 108 designates the network interface 110 as being in the inactive mode (step 724). In some embodiments, separate and distinct polling intervals, retransmission counters, and retransmission thresholds are provided for interface isolation indications and timer-reset indications, respectively. After the step 724, the method 700 terminates.

In a particular embodiment, the techniques disclosed herein may be implemented in component handlers of physical link states in Ethernet switches. The topology generation protocol, such as spanning tree protocol, may be augmented to include the isolated mode, in which the quality of a link is evaluated without forwarding user data or network control frames on the link. The isolated mode may be added between link states defined by the topology generation protocol. For instance, the isolated mode may be added as a state between an offline state and a learning/operational state, where the learning/operational state indicates that the data-link-layer protocols are already working; doing so helps ensure the physical layer is functional before transitioning to the learning/operational state. Alternatively, the active, isolated, and inactive modes may be defined as a set of statuses separate from the set of states defined by the topology generation protocol, where the set of statuses includes an active status, an inactive status, and an isolated status. In a particular embodiment, a connection is added between a physical-link engine and upper network layers, to detect if configurable thresholds of newly introduced error types are triggered. If the thresholds are triggered, physical-link engine activates the isolated mode. The physical-link engine may then perform link diagnostics before activating the offline state or the learning/operation state, depending on the results of the diagnostics.

Aside from the state representing the isolated mode, the topology generation protocol may include states such as blocking, listening, learning, forwarding, and disabled. In the context of the spanning tree protocol, each port may begin in the blocking state and, based on predefined time periods elapsing, subsequently transition to the listening state and, in turn, the learning state, followed by the forwarding state. When the port is in the blocking state, the switch is only listening to and processing bridge protocol data units (BPDUs), which contain information on ports, switches, port priority, and addresses, for configuring and maintaining a spanning tree topology. When the port is in the listening state, the switch processes BPDUs to generate the topology. When the port is in the learning state, the switch processes BPDUs and user frames and updates the MAC table but does not forward the user frames to their destination. When the port is in the forwarding state, the switch processes BPDUs, update the MAC table, and forward the user frames through the port. When the port is in the disabled state, the port does not participate in any frame forwarding or spanning tree protocol operations.

By dampening flapping rates of network interfaces according to the techniques disclosed herein, network stability may be improved at least relative to alternative approaches that do not dampen flapping rates in the manner disclosed herein. Examples of alternative approaches include edge port protection, root bridge protection, bi-directional forwarding detection, uplink failure detection, and transition hiding. In edge port protection, ports not connected to switches are not permitted to trigger clearing of MAC tables, but inter-switch connections are not accounted for. Root bridge protection prevents a switch from assuming root ownership during a topology change if the switch does not have additional configuration parameters set, but root bridge protection does not stabilize the network environment when link flaps occur. Bi-directional forwarding detection involves determining if the other side of a link sees communication from the originating node, but is limited to routing protocols or Layer-3 changes. Uplink failure detection involves forcing (and incurring) a ripple-effect failover on downstream devices upon detecting an uplink being set to administratively down. Transition hiding keeps an interface up despite rapid transitions and further does not take into account routes removed or topology changes in determining how quickly to isolate an interface based on a measure of overall impact to the network environment.

Figure 8:
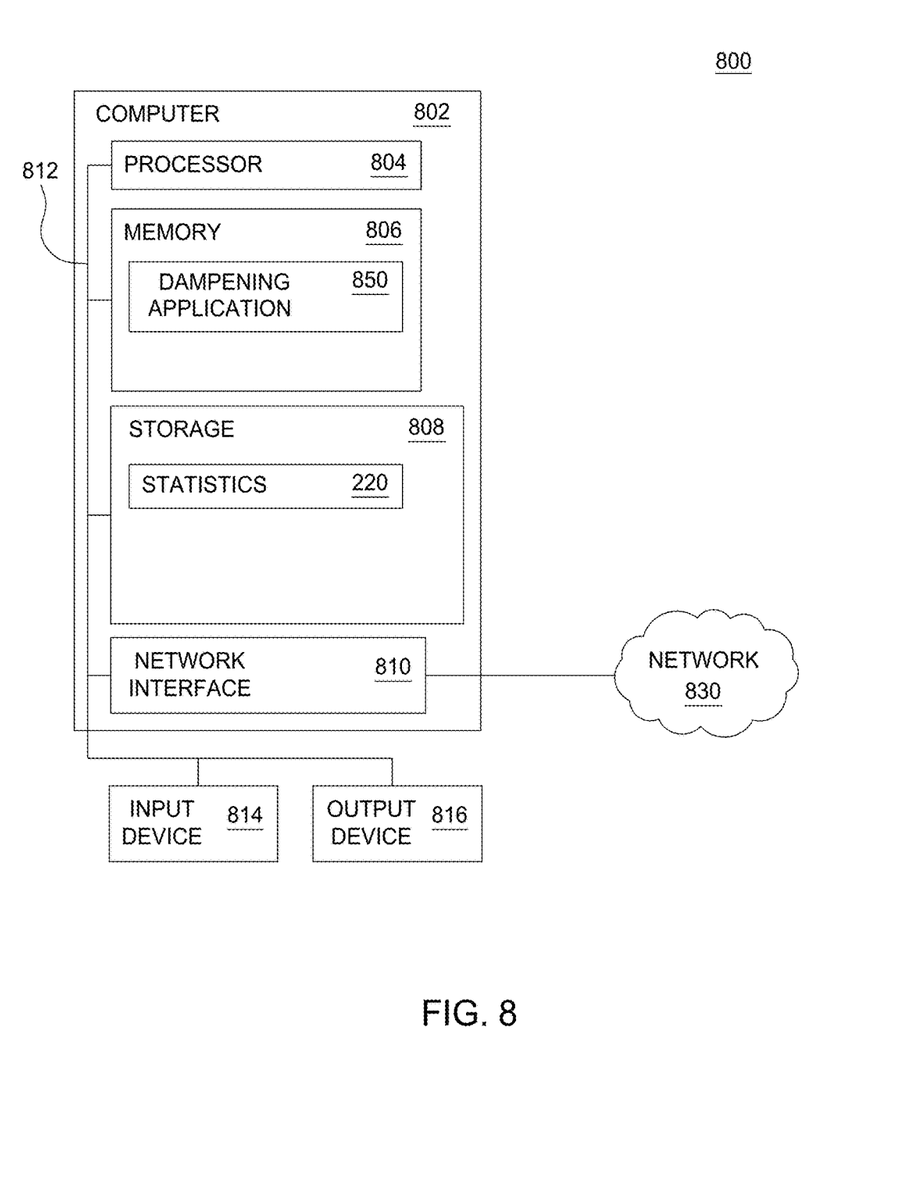
FIG. 8 is a block diagram illustrating hardware components of the system configured to dampen flapping rates of network interfaces to improve stability of the network environment, according to one embodiment presented in this disclosure.

FIG. 8 is a block diagram illustrating hardware components of a system 800 configured to dampen flapping rates of network interfaces to improve stability of a network environment, according to one embodiment presented in this disclosure. The system 800 includes a computer 802 configured to connect to other computers via a network 830. In general, the network 830 may be a telecommunications network and/or a wide area network (WAN). In a particular embodiment, the network 830 is the Internet.

The computer 802 generally includes a processor 804 connected via a bus 812 to a memory 806, a network interface device 810, a storage 808, an input device 814, and an output device 816. The computer 802 is generally under the control of an operating system. Examples of operating systems include UNIX, versions of the Microsoft Windows® operating system, and distributions of the Linux® operating system. More generally, any operating system supporting the functions disclosed herein may be used. The processor 908 is included to be representative of a single CPU, multiple CPUs, a single CPU having multiple processing cores, and the like. Similarly, the memory 806 may be a random access memory. While the memory 806 is shown as a single identity, it should be understood that the memory 806 may comprise a plurality of modules, and that the memory 806 may exist at multiple levels, from high speed registers and caches to lower speed but larger DRAM chips. The network interface device 810 may be any type of network communications device allowing the computer 802 to communicate with other computers via the network 830.

The storage 808 may be a persistent storage device. Although the storage 808 is shown as a single unit, the storage 808 may be a combination of fixed and/or removable storage devices, such as fixed disc drives, solid state drives, floppy disc drives, tape drives, removable memory cards or optical storage. The memory 806 and the storage 808 may be part of one virtual address space spanning multiple primary and secondary storage devices.

The input device 814 may be any device for providing input to the computer 802. For example, a keyboard and/or a mouse may be used. The output device 816 may be any device for providing output to a user of the computer 802. For example, the output device 816 may be any conventional display screen or set of speakers. Although shown separately from the input device 814, the output device 816 and input device 814 may be combined. For example, a display screen with an integrated touch-screen may be used.

As shown, the memory 806 of the computer 802 includes a dampening application 850, and the storage 808 includes the statistics 220. The dampening application 850 is configured with functionality of the isolable switch 102 of FIG. 1, including functionality of the dampening logic 108 of FIG. 1. By configuring the dampening application 850 according to the techniques disclosed herein, stability of the network environment may be improved at least in some cases.

The descriptions of the various embodiments disclosed herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments presented in this disclosure may be a system, a method, and/or a computer program product. The computer program product may include a computer readable storage medium (or media) having computer readable program instructions thereon for causing a processor to carry out aspects presented in this disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations presented in this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented in this disclosure.

Aspects presented in this disclosure are described herein with reference to flowchart illustrations and/or block diagrams of methods, apparatus (systems), and computer program products according to embodiments disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments presented in this disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments presented in this disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of embodiments presented in this disclosure, a user may access applications or related data available in the cloud, where the cloud computing infrastructure includes one or more isolable switches disclosed herein. The inclusion of isolable switches permits dampening of flapping rates of network interfaces, which may improve network stability of the cloud computing infrastructure at least in some cases, thereby improving availability and/or reliability of the applications and data available in the cloud.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to provide network stability by dampening an interface flapping rate between switches in a network environment, the computer-implemented method comprising:
   designating an interface of a first switch as being in an active mode in which forwarding activity of the interface is permitted, wherein the first switch is operatively connected to a second switch via the interface;
   upon determining that the interface exhibits flapping behavior satisfying one or more dampening criteria when in the active mode, the flapping behavior characterized by a switch failure causing the interface to continually fluctuate between online and offline states, sending, to the second switch, an isolation indication that causes the second switch to designate an interface of the second switch as being in an isolated mode in which health monitoring is permitted but forwarding activity is prohibited;
   upon receiving, from the second switch, an isolation reply to the isolation indication, designating the interface of the first switch as being in the isolated mode in order to preclude any flapping behavior of the interface of the first switch from impacting stability of the network environment; and
   upon determining that the interface of the first switch satisfies one or more reinstatement criteria when in the isolated mode, redesignating the interface of the first switch as being in the active mode by operation of one or more computer processors.

2. The computer-implemented method of claim 1, wherein the isolation indication indicates that the interface of the first switch is to be isolated, wherein the isolation reply indicates that the interface of the second switch is also to be isolated, wherein upon the interface of the second switch satisfying the one or more reinstatement criteria, the interface of the second switch is designated as being in the active mode;
   wherein the one or more dampening criteria are evaluated over an evaluation time interval, wherein the interface of the first switch when in the isolated mode is monitored for errors and transitions, wherein the computer-implemented method is performed by the first switch, wherein the first switch is configured to:
   upon failing to receive, from the second switch, any isolation reply to the isolation indication, designate the interface of the first switch as being in an inactive mode in which forwarding activity is prohibited.

3. The computer-implemented method of claim 2, wherein the interface of the first switch is designated as being in the isolated mode such that from the perspective of any network protocol for routing or topology generation, the interface of the first switch is regarded as being effectively offline despite the interface of the first switch actually exhibiting flapping behavior;
   wherein any flapping of the interface of the first switch when in isolated mode does not trigger any clearing of media access control (MAC) tables in one or more switches in the network environment and does not trigger any associated flooding of the network environment for rebuilding the MAC tables;
   wherein any flapping of the interface of the first switch when in isolated mode does not trigger any purging and installation of routes in the one or more switches in the network environment.

4. The computer-implemented method of claim 3, wherein the interface of the first switch is assignable as being in the isolated mode upon detecting at least a threshold count of topology change notifications being issued in a predefined notification time interval due to the flapping behavior of the interface of the first switch;
   wherein the interface of the first switch is assignable as being in the isolated mode upon detecting at least a threshold count of routes being withdrawn or added due to the flapping behavior of the interface of the first switch;
   wherein the interface of the first switch is assignable as being in the isolated mode upon detecting at least a threshold count of flapping occurrences of the interface of the first switch in an occurrence time interval.

5. The computer-implemented method of claim 4, wherein the interface of the first switch is reintroduced to the network environment by redesignating the interface of the first switch as being in the active mode, wherein the interface of the first switch is reintroduced to the network environment upon detecting less than the threshold count of flapping occurrences of the interface of the first switch over a predefined isolation time interval, wherein the predefined isolation time interval is subsequent to designating the interface of the first switch as being in the isolated mode;
   wherein in the inactive mode, both forwarding activity and health monitoring of the interface is prohibited, wherein the interface of the first switch when in the active mode is ineligible for a predefined mechanism for reintroduction to the network environment even when satisfying the one or more reinstatement criteria;
   wherein the interface of the first switch when in the isolated mode is eligible for the predefined mechanism for reintroduction to the network environment based on the one or more reinstatement criteria.

6. The computer-implemented method of claim 5, wherein the topology change notifications are issued according to a network protocol for topology generation, wherein the network protocol for topology generation comprises spanning tree protocol;

wherein the interface of the first switch is designated as being in the isolated mode only upon receiving the isolation reply from the second switch, in order to preclude a black hole from being formed and silently dropping traffic in the network environment;

wherein the interface of the first switch is designated as being in the inactive mode upon failing to receive, within a reply time interval, any isolation reply to the isolation indication.

7. The computer-implemented method of claim 6, wherein the first switch is further configured to:

upon detecting at least the threshold count of flapping occurrences of the interface of the first switch over the isolation time interval subsequent to designating the interface as being in the isolated mode, send, to the second switch, an indication to restart the isolation time interval;

upon receiving, from the second switch, a reply to the indication to restart the predefined isolation time interval, restart the predefined isolation time interval in order to determine presence of at least the threshold count of flapping occurrence of the interface of the first switch over the restarted isolation time interval; and upon failing to receive, within the reply time interval, any reply to the indication to restart the predefined isolation time interval, designate the interface of the first switch as being in the inactive mode;

wherein the evaluation time interval, the occurrence time interval, the isolation time interval, and the reply time interval are each configurable based on user input;

wherein the threshold count of topology change notifications, the threshold count of routes being withdrawn, the threshold count of routes being added, and the threshold count of flapping occurrences are each configurable based on user input;

wherein the isolated mode is, in respective instances: (i) an isolated state between an offline state and a learning state; and (ii) an isolated status of a plurality of statuses separate from a plurality of states including the offline state and the learning state.

8. The computer-implemented method of claim 1, wherein the computer-implemented method is performed by the first switch, wherein the first switch is configured to:

upon failing to receive, from the second switch, any isolation reply to the isolation indication, designate the interface of the first switch as being in an inactive mode in which forwarding activity is prohibited.

9. The computer-implemented method of claim 1, wherein the interface of the first switch is designated as being in the isolated mode only upon receiving the isolation reply from the second switch, in order to preclude a black hole from being formed and silently dropping traffic in the network environment.

10. The computer-implemented method of claim 1, wherein the interface of the first switch is assignable as being in the isolated mode upon detecting at least one of:

(i) a threshold count of topology change notifications being issued in a predefined notification time interval due to the flapping behavior of the interface of the first switch;

(ii) a threshold count of routes being withdrawn or added due to the flapping behavior of the interface of the first switch; and (ii) a threshold count of flapping occurrences of the interface of the first switch in an occurrence time interval.

11. A computer program product to provide network stability by dampening an interface flapping rate between switches in a network environment, the computer program product comprising:

a non-transitory computer-readable medium having computer-readable program code embodied therewith, the computer-readable program code executable by one or more computer processors to perform an operation comprising:

designating an interface of a first switch as being in an active mode in which forwarding activity of the interface is permitted, wherein the first switch is operatively connected to a second switch via the interface;

upon determining that the interface exhibits flapping behavior satisfying one or more dampening criteria when in the active mode, the flapping behavior characterized by a switch failure causing the interface to continually fluctuate between online and offline states, sending, to the second switch, an isolation indication that causes the second switch to designate an interface of the second switch as being in an isolated mode in which health monitoring is permitted but forwarding activity is prohibited;

upon receiving, from the second switch, an isolation reply to the isolation indication, designating the interface of the first switch as being in the isolated mode in order to preclude any flapping behavior of the interface of the first switch from impacting stability of the network environment; and upon determining that the interface of the first switch satisfies one or more reinstatement criteria when in the isolated mode, redesignating the interface of the first switch as being in the active mode.

12. The computer program product of claim 11, wherein the operation is performed by the first switch, wherein the first switch is configured to:

upon failing to receive, from the second switch, any isolation reply to the isolation indication, designate the interface of the first switch as being in an inactive mode in which forwarding activity is prohibited.

13. The computer program product of claim 11, wherein the interface of the first switch is designated as being in the isolated mode only upon receiving the isolation reply from the second switch, in order to preclude a black hole from being formed and silently dropping traffic in the network environment.

14. The computer program product of claim 11, wherein the interface of the first switch is assignable as being in the isolated mode upon detecting at least one of:

(i) a threshold count of topology change notifications being issued in a predefined notification time interval due to the flapping behavior of the interface of the first switch;

(ii) a threshold count of routes being withdrawn or added due to the flapping behavior of the interface of the first switch; and (ii) a threshold count of flapping occurrences of the interface of the first switch in an occurrence time interval.

15. The computer program product of claim 11, wherein the isolation indication indicates that the interface of the first switch is to be isolated, wherein the isolation reply indicates that the interface of the second switch is also to be isolated.

16. An apparatus to provide network stability by dampening an interface flapping rate between switches in a network environment, the apparatus comprising:

one or more computer processors;

an interface operatively connecting the apparatus to a target switch; and logic operatively connected with the interface, wherein the one or more computer processors execute the logic to perform an operation comprising:

designating the interface as being in an active mode in which forwarding activity of the interface is permitted;

upon determining that the interface exhibits flapping behavior satisfying one or more dampening criteria when in the active mode, the flapping behavior characterized by a switch failure causing the interface to continually fluctuate between online and offline states, sending, to the target switch, an isolation indication that causes the target switch to designate an interface of the target switch as being in an isolated mode in which health monitoring is permitted but forwarding activity is prohibited;

upon receiving, from the target switch, an isolation reply to the isolation indication, designating the interface of the apparatus as being in the isolated mode in order to preclude any flapping behavior of the interface of the apparatus from impacting stability of the network environment; and upon determining that the interface of the apparatus satisfies one or more reinstatement criteria when in the isolated mode, redesignating the interface of the apparatus as being in the active mode.

17. The apparatus of claim 16, wherein the operation further comprises:

upon failing to receive, from the target switch, any isolation reply to the isolation indication, designating the interface of the apparatus as being in an inactive mode in which forwarding activity is prohibited.

18. The apparatus of claim 16, wherein the interface of the apparatus is designated as being in the isolated mode only upon receiving the isolation reply from the target switch, in order to preclude a black hole from being formed and silently dropping traffic in the network environment.

19. The apparatus of claim 16, wherein the interface of the apparatus is assignable as being in the isolated mode upon detecting at least one of:

(i) a threshold count of topology change notifications being issued in a predefined notification time interval due to the flapping behavior of the interface of the apparatus;

(ii) a threshold count of routes being withdrawn or added due to the flapping behavior of the interface of the apparatus; and (ii) a threshold count of flapping occurrences of the interface of the apparatus in an occurrence time interval.

20. The apparatus of claim 16, wherein the isolation indication indicates that the interface of the apparatus is to be isolated, wherein the isolation reply indicates that the interface of the target switch is also to be isolated.

* * * * *